United States Patent
Azenkot et al.

(10) Patent No.: US 7,443,914 B2
(45) Date of Patent: Oct. 28, 2008

(54) DFE TO FFE EQUALIZATION COEFFICIENT CONVERSION PROCESS FOR DOCSIS 2.0

(76) Inventors: Yehuda Azenkot, 1128 Littleoak Cir., San Jose, CA (US) 95129; Selim Shlomo Rakib, 10271 W. Acres, Cupertino, CA (US) 95014; Nathalie Anny Tal, 6117 Elmbridge Dr., San Jose, CA (US) 95129

( * ) Notice: Subject to any disclaimer, the term of this patent is extended or adjusted under 35 U.S.C. 154(b) by 736 days.

(21) Appl. No.: 10/975,177

(22) Filed: Oct. 27, 2004

(65) Prior Publication Data

US 2006/0088090 A1    Apr. 27, 2006

(51) Int. Cl.
H03H 7/30 (2006.01)
H03H 7/40 (2006.01)
H03K 5/159 (2006.01)

(52) U.S. Cl. .................. 375/233; 375/229; 375/230; 375/231; 375/232

(58) Field of Classification Search ................ 375/229, 375/230, 231, 232, 233
See application file for complete search history.

(56) References Cited

U.S. PATENT DOCUMENTS 5,321,512 A   6/1994  Huang
6,069,917 A   5/2000  Werner et al.

2004/0120394 A1   6/2004  Miao et al.

OTHER PUBLICATIONS

International Search Report, International Application No. PCT/US05/37851, date mailed Oct. 12, 2006.

*Primary Examiner*—Ted Wang
(74) *Attorney, Agent, or Firm*—Thelen LLP

(57) ABSTRACT

A method and appartus for converting FFE and FBE coefficients from a DOCSIS compatible cable modem termination system upstream equalizer into FFE only coefficients to be sent down to the cable modem which transmitted the training burst which resulted in convergence on the FFE and FBE coefficients. The method involves programming an FBE like conversion structure comprised of an FFE filter and an FBE filter whose outputs are summed with the FFE and FBE coefficients from the CMTS equalizer. The FFE coefficients are stored in the FFE filter of the conversion structure. The FBE coefficients are stored in an FBE filter of the conversion structure. Then, an input vector which simulates the Dirac function (an impulse) is input to the conversion structure to derive coefficients at its output which define the impulse response and transfer function of the conversion structure. These coefficients are the FFE only coefficients which may be used to select a subset of 24 for sending to the cable modem.

10 Claims, 6 Drawing Sheets

PRIOR ART TAPPED DELAY LINE FILTER

PRIOR ART DFE

DFE TO FFE EQUALIZATION COEFFICIENT CONVERSION PROCESS FOR DOCSIS 2.0

BACKGROUND OF THE INVENTION

In digital data cable modem systems, data is transmitted between a headend and a plurality of cable modems all of which are coupled to a hybrid fiber coaxial cable network. Because of imperfections in the system, such as taps which are not properly terminated, echoes from signals reflected from taps not properly terminated and ingress noise greatly affects the performance of the system, especially the upstream. To combat this noise, adaptive equalization has been used in the central unit receiver for combatting upstream noise and adaptive equalization in the cable modem receivers has been used to combat downstream noise.

Signal transmission channels have a property called dispersion which changes the shape of pulses which encode symbols being transmitted. Dispersion arises from the fact that every pulse is comprised of a plurality of Fourier components, each of which is a sinusoid of a different frequency and different amplitude and which, when added together, define the shape of the pulse. Dispersion and pulse shape changes arise from the fact that different frequency Fourier components propagate at different velocities. This phenomenon causes intersymbol interference or ISI between neighboring pulses, and ISI limits the number of discrete amplitude levels for symbol pulses which can be successfully detected. Equalization is a way of eliminating or reducing ISI.

If the exact characteristics of the channel are known, ISI can be eliminated or reduced substantially by using a pair of filters, one at the transmitter and one at the receiver to control the pulse shape distortion. The transmit filter is placed just before the modulator, and does pre-channel equalization. The receive filter is placed just after the demodulator and before the slicer, and does post-channel equalization. If the filter characteristics of these filters are set correctly, the transmit filter predistorts the pulse shapes so that the distortions in the channel do not cause ISI at the sample instants and the receive filter takes care of any remaining ISI noise before each received symbol is fed to the slicer for decision.

In practice however, the precise characteristics of the channel are rarely known in advance, and are time varying. In addition, there is always imprecision that arises in implementation of the filters. The net result is that there is always some residual distortion such that ISI will limit the data rate of the system. To compensate for this residual distortion, a process called equalization is used, and the filter which is used to do it is called an equalizer. Equalizers are adaptive usually to adjust to time varying needs for ISI reduction.

Adaptive equalizers are digital tapped delay line filters with impulse responses defined by the tap weights. These tap weights are called the filter coefficients. FIG. 1 is a block diagram of a typical prior art tapped delay line equalization digital filter. In synchronous equalizers, the taps are spaced along the delay line at the duration of the symbol. In some systems, only pre-channel equalization is used, but this requires a feedback channel if the pre-channel equalizer is adaptive. In most systems, post-channel adaptive equalization is used, and a training data sequence is sent before sending the payload data so that the post channel equalizer can adapt its coefficients for maximum ISI cancellation.

The adaptive equalization process involves setting tap weights, receiving training data and data symbols and processing it to determine whether slicer errors are occurring or will occur in reception of the data, then altering the tap weights and, sometimes, processing the training data again to determine if the number of errors was reduced. The process of adapting the tap weights to change the filter characteristics continues until the number of errors in reception is minimized, which is a state called convergence. Typically, adaptation is achieved by observing the error between the desired pulse shape and the actual pulse shape at the output of the equalizer filter, measured at the sampling instants, and then using this error to determine the direction in which the tap weights should be altered to approach an optimum set of values.

Equalization systems exist in at least two varieties: DFE and FFE. DFE stands for Decision Feedback Equalization and FFE stands for Feed Forward Equalization. Every channel through which symbols are transmitted has an impulse response which represents a transfer function and defines how the channel will affect a pulse propagating through it. In the sampled form, the impulse response of every channel has a term which represents the effect of precursors in the impulse response which occur before the main sample associated with the desired data symbol. The impulse response also has a term which is represents the effect of postcursors in the impulse response which happen after the main sample. FIG. 2 represents the precursor and postcursor parts of impulse response in sampled form. The idea of Decision Feedback Equalization is to use data decisions made on the basis of precursors of the channel impulse response to take care of the postcursors. For the idea to work however, the decisions have to be correct.

A DFE equalizer consists of a feedforward section, a feedback section, and a decision device, connected as shown in FIG. 3.

A consortium of cable system operators have formed Cable Labs as a body to develop standards for compatibility of the products of various headend and cable modem equipment manufacturers so that units from different manufacturers may be "plug-n-play".

The first standard developed by Cable Labs and the members thereof was DOCSIS 1.0.

DOCSIS 1.X cable modems (hereafter any cable modem may be referred to as a CM) and DOCSIS 1.X Cable Modem Termination Systems (hereafter CMTS) only use FFE equalization filters. However, in DOCSIS 2.0 Cable Modem Termination Systems, both FFE and FBE equalization filters are used. This means that the FBE filter coefficients will feed back a signal to the summer which will reduce the post cursor efects on the data reaching the decision device, altering the decision error. This in turn will affect the adaptation of the FFE filter.

In DOCSIS 2.0, it is mandatory that all CMs use only FFE equalization filters.

Therefore, a need has arisen for a method to convert DOCSIS 2.0 DFE equalization coefficients to feed forward coefficients to match the DOCSIS requirement at the modem side.

SUMMARY OF THE INVENTION

The process of the invention contemplates the following steps accessing feed forward, hereafter FFE, and feedback, hereafter FBE, coefficients generated by a cable modem termination system upstream equalizer after processing a training burst or data symbols from a cable modem, and storing said FFE coefficients in coefficient memories of a conversion filter structure having an feed forward filter, a feedback filter and a means for summing the results of each of said feed forward and feedback filters every symbol time, and storing said FBE coefficients in coefficient memories of said feedback filter of said conversion filter structure;

calculating an impulse response of said conversion filter structure, as defined by a plurality of FFE only coefficients output by said conversion filter structure; and selecting a subset of FFE only coefficients from said coefficients output by said conversion filter structure which define said impulse response.

The apparatus of the invention contemplates the following structure:

a feed forward digital filter having an input and a plurality of coefficient memories programmed with FFE coefficients from an FFE filter of a cable modem termination system DFE equalizer after said equalizer has converged upon said FFE coefficients after processing a training burst from a cable modem and having an output at which appears results of processing signals appearing at said input;

a feedback digital filter having an input and having an output and having a plurality of coefficient memories each storing an FBE coefficient from a feedback filter of said cable modem termination system DFE equalizer after said equalizer has converged upon said FFE coefficients after processing a training burst from a cable modem and having an output at which appears inverted results of processing signals appearing at said input a summer coupled to receive output results from said feed forward digital filter and said feedback digital filter, for summing said results during every symbol time and outputting the sum.

DETAILED DESCRIPTION OF THE PREFERRED AND ALTERNATIVE EMBODIMENTS

Prior art FFE only equalization filters used in DOCSIS systems can correct for both precursor and post cursor interference. Precursor interference results mainly from filter effects causes by channel impairments which cause distributed parasitic inductance and capacitance and other impairments that cause dispersion, i.e., different propagation velocities for different frequencies. This changes pulse shapes. Postcursor interference results from echoes in the channel. Prior art FFE only equalizers equalize both precursor and postcursor interference by varying the position of the main tap.

Figure 1:
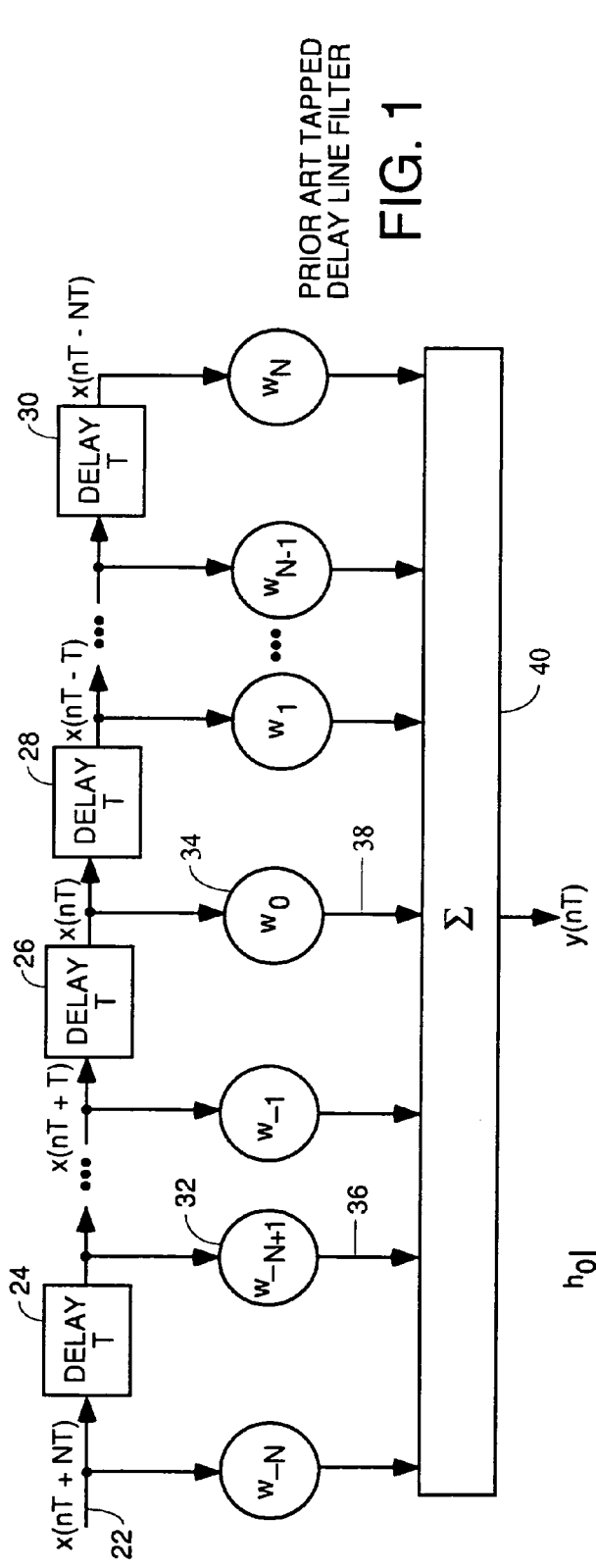
FIG. 1 is a block diagram of a prior art tapped delay line filter.

Prior art FFE only equalization filters have the structure shown in FIG. 1. The received symbol arrives on line 22 and passes through several delay stages 24, 26, 28 and 30 which typically are shift register stages. The output of each shift register is input to a multiplier of which 32 and 34 are typical. Each multiplier multiplies the delayed version of the input signal by a different tap weight or coefficient. The products of these multiplications, such as the signals on lines 36 and 38, are summed in a summer 40. By changing the tap weights, the filter characteristics can be changed to adjust for filter effects of the channel. The equalization process is an iterative process to adjust these tap weights using least mean square circuitry (not shown) to minimize slicer errors in a hard decision device (not shown) which receives the output of the FFE filter. The tap weight coefficients cause the filter to have filter characteristics such that the signals propagating therethrough are altered so as to cancel out the effects of the channel, or, in the case of an FFE filter acting as a prefilter at the transmitter, so to predistort the transmitted signal to compensate for known filter effects the signal will encounter in the channel as it propagates therethrough.

Figure 3:
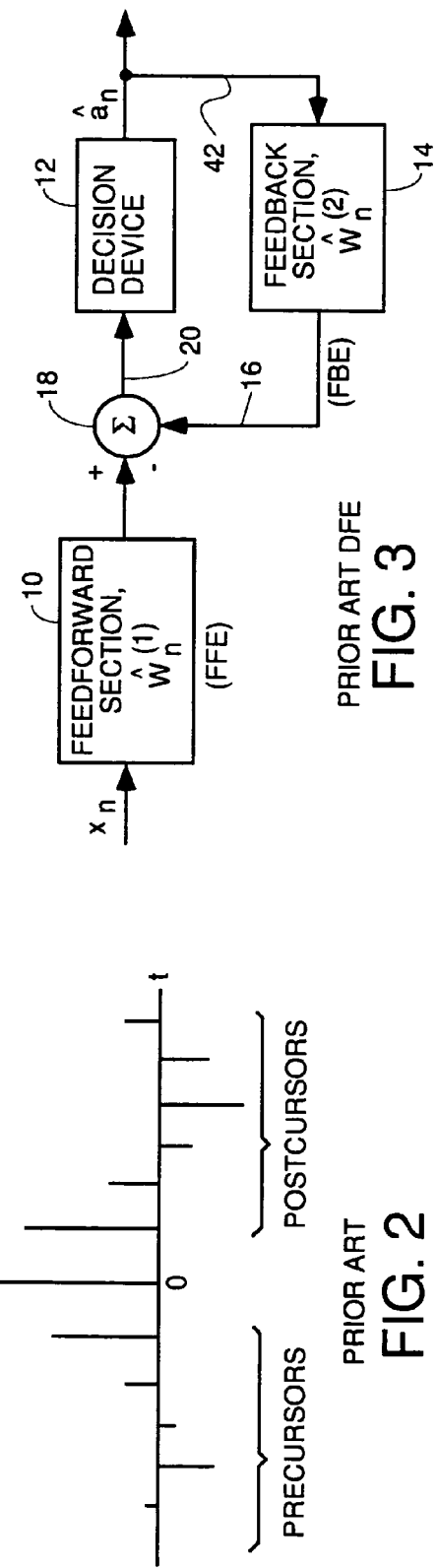
FIG. 3 is a block diagram of a prior art DFE equalizer.
Figure 2:
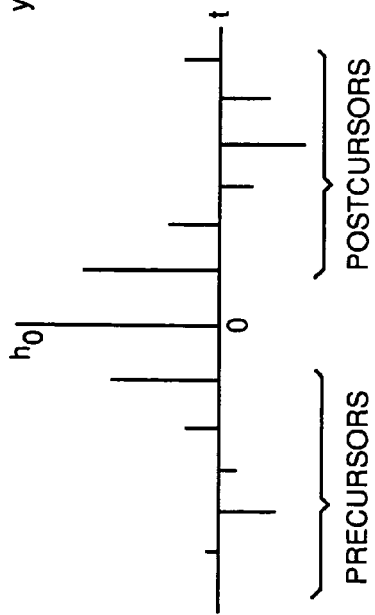
FIG. 2 represents the precursor and postcursor impulse response in sampled form.

A prior art DFE equalization filter is shown in FIG. 3. A feed forward filter 10 typically has the structure of FIG. 1. The output of the FFE filter 10 is coupled to one input of a summer 18. The other input of the summer, line 16 is the output of a feedback section digital filter (FBE) which can also have the structure of FIG. 1. The difference between the feed forward and the feedback filters is in the tap weight coefficients. The tap weight coefficients of the feeback section are adjusted to minimize the effects of post cursor interference while the feed forward filter coefficients are adjusted to minimize pre cursor interference. The result output from the feedback section on line 16 is subtracted by summer 18 from the output of the feedforward section. A decision device called a slicer 12 then examines the difference signal and outputs a decision on line 42 as to what the transmitted symbol was.

The prior art FFE equalization filter only has knowledge of the received symbols in the values of the tap weights. In DOCSIS, known preamble symbols are transmitted during the beginning of the burst. A known process in each cable modem uses these known preamble symbols to adjust tap weighting coefficients for the FFE precoder filter.

Figure 4:
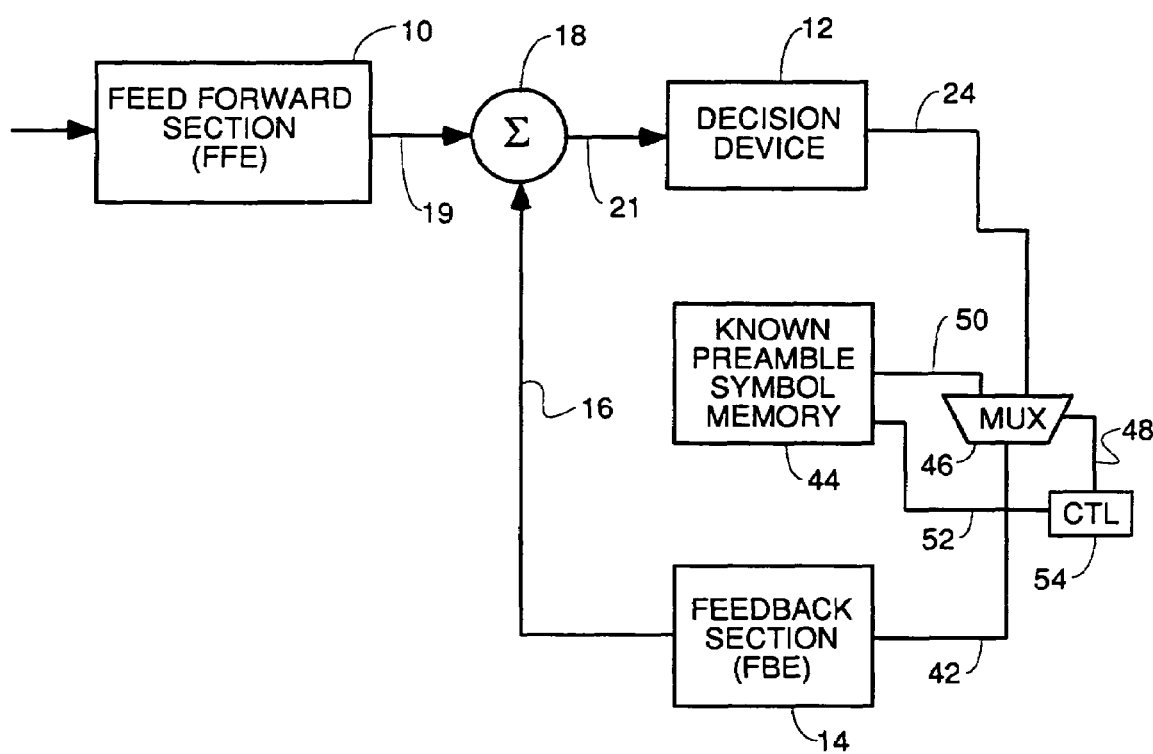
FIG. 4 is a block diagram of a DOCSIS receiver DFE equalizer which makes use of the fact that the symbols which are transmitted during the preamble are known and which substitutes these known symbols for the output of the decision device during processing of the received preamble symbols.

FIG. 4 is a block diagram of a DOCSIS DFE equalizer which makes use of the fact that the symbols which are transmitted during the preamble are known and which substitutes these known symbols for the output of the decision device during reception of the preamble. In FIG. 4, the feedforward filter 10, the feedback filter 14, the summer 18 and the decision device 12 all are structured and function as previously described in FIG. 3. The difference lies in the addition of a known preamble symbol memory 44 and multiplexer 46. The memory 44 stores the known symbols that are transmitted during the preamble portion of training bursts. The multiplexer is controlled by a control signal on line 48 to select the output of memory 44 on line 50 during the intervals when preamble symbols are being received. The memory 44 is controlled by signals on line 52 to output the known preamble symbols in synchronization with the arrival thereof. The control unit 54 is possibly a microprocessor in the CMTS, or a gate array, or sequential state machine, etc.

The input on line 42 to the feedback section of the actual symbols transmitted causes the feedback section to have its filter coefficients adjusted by conventional Least Mean Square circutry (not shown) to converge on proper coefficients to equalize the upstream channel. This convergence happens more quickly since the input symbols to the feedback section are not guesses made by the decision device. The feedback section 14 outputs an estimate of the echo on line 16. This estimate is subtracted from the output signal from the feedforward section, (which cancels precursor interference) and outputs a signal on line 19 which does not have the effects of precursor interference but still has the effects of echo in it. The summer removes all or most of the echo by subtracting the signal on line 16. The output of the equalizer on line 21 is the clean symbol. After the preamble interval, the output of the decision device 12 on line 24, which is the estimated received symbol, is switched by multiplexer 46 and control circuit 54 so as to be coupled to the input of feedback section 14.

One difference between the feedforward filter of FIG. 1 and the feedforward section 10 in FIGS. 3 and 4 is the position of the main tap. In FIG. 1, the main tap is usually tap 34 coupled to the middle of the delay line. In the equalizers of FIGS. 3 and 4, the main tap is the last tap closest to the summer.

A T-space FFE equalizer means the received samples are sampled in time spaced by an interval T so as to be sampled at the transmit sample rate. In a T-space equalizer, the delay line sections each impose a delay equal to one sample period. There are also T/2 and T/4 equalizers. T/2 equalizers use two samples per symbol (each delay section has a delay of ½ the sample interval), and T/4 equalizers use four samples per symbol.

It is well known that equalization filters which include DFE filters perform better than FFE only filters, especially in low SNR systems. This is because such equalization filters are nonlinear, and nonlinear filters perform better than linear filters. DFE filters also are more effective because they can have as inputs information regarding what symbols to expect, i.e., the expected symbols (preamble) are an input to the DFE filter, or the symbols after slicer are used.

Conversion of DFE Tap Weights to FFE Tap Weights

In certain CMTS structures built by the assignee of the present invention, the equalizer is designed to output DFE coefficients whenever the ranging burst being processed was transmitted by a cable modem. In DOCSIS, it is mandatory for all types of cable modems to use only an FFE structure for the pre-transmit filter. Therefore, what needs to be done is to convert DFE tap weights to FFE filter tap weights by a suitable algorithm in the CMTS before the coefficients are sent down to a CM which transmitted a ranging burst but which only has an FFE preequalizer.

DOCSIS 1.X modems have only 8 FFE taps, while all other modems have 24 taps. The conversion module produces 32 taps. After identifying from MAC parameters if the cable modem which sent said ranging burst is DOCSIS 1.X or 2.0, and what the desired main tap location is, the CMTS will select the appropriate set of 8 or 24 taps to be sent to the modem.

In the preferred form of DOCSIS compliant CMTS, upstream equalization is always being done using an equalizer with FFE and FBE filters regardless of whether a training or data burst was sent. The resulting FFE and FBE equalization coefficients are then converted to all FFE upstream equalization filter coefficients. The conversion is done, and the resulting FFE only equalization filter coefficients are sent downstream to the DOCSIS cable modem that sent the training burst from which the upstream equalization coefficients were developed.

Figure 5:
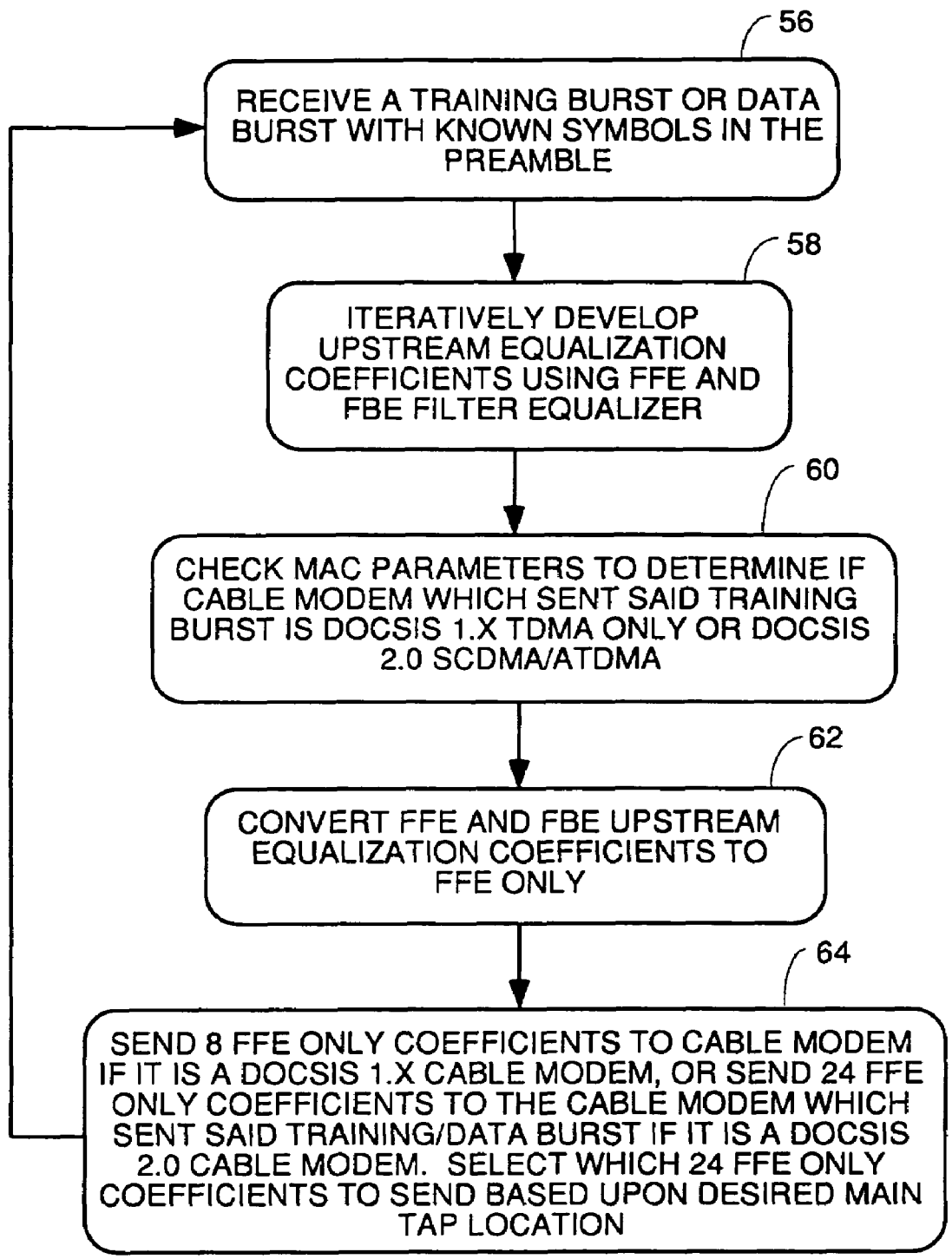
FIG. 5 is a flowchart illustrating an embodiment of a process carried out in the CMTS of converting the FFE and FBE coefficients to only FFE coefficients prior to sending the coefficients downstream, and deciding how many and which FFE coefficients to send.

FIG. 5 is a flowchart illustrating an alternative embodiment of a process carried out in the CMTS of converting the FFE and FBE coefficients from the CMTS equalizer to FFE only coefficients, and deciding how many FFE coefficients should be sent to the modem after conversion from FFE and FBE to FFE only. Step 56 represents receiving a training burst or data burst in the CMTS. That training or data burst will have a preamble of known symbols.

Those known symbols are used to iteratively develop upstream equalization coefficients in the FFE and FBE filter based CMTS equalizer, as represented by step 58. Step 60 represents the process of checking the MAC parameters to determine if the cable modem which sent the training burst which was used to develop the equalization coefficients is a DOCSIS 1.X Time Division Multiple Access (TDMA) only modem or is a DOCSIS 2.0 Synchronous Code Division Multiple Access (SCDMA) or Advanced Time Divsion Multiple Acces (ATDMA) modem. In DOCSIS systems, the cable modems identify themselves when they register with the CMTS, and that identification data includes the capability of the modem in terms of which DOCSIS specification it complies with. The training bursts also contain temporary Service Identification Numbers or SIDs which identify the cable modem. This SID can be used to look up the modem's capabilities from information stored in the CMTS. In step 62, the FFE and FBE equalization coefficients developed by the CMTS from the training or data burst sent by the cable modem are converted to FFE only by using the conversion filter structure of FIG. 7 in the manner specified in the process flow of FIG. 6. Finally, in step 64, if the cable modem which sent the training burst or data burst is DOCSIS 1.X, only the first 8 FFE coefficients output by the conversion filter structure of FIG. 7 are sent to the cable modem. However, if the cable modem which sent said training burst or data burst is a DOCSIS 2.0 cable modem, 24 of the total FFE coefficients generated by the conversion filter structure of FIG. 7 are sent to the cable modem. Which 24 are sent is determined by where the CMTS wants to specify the main tap location in the cable modem upstream equalization filter.

A description of the algorithm to do this in software follows. The essence of the algorithm is to replace the DFE structure with an FFE structure where the coefficients are the symbol spaced samples of the DFE impulse response.

Figure 6:
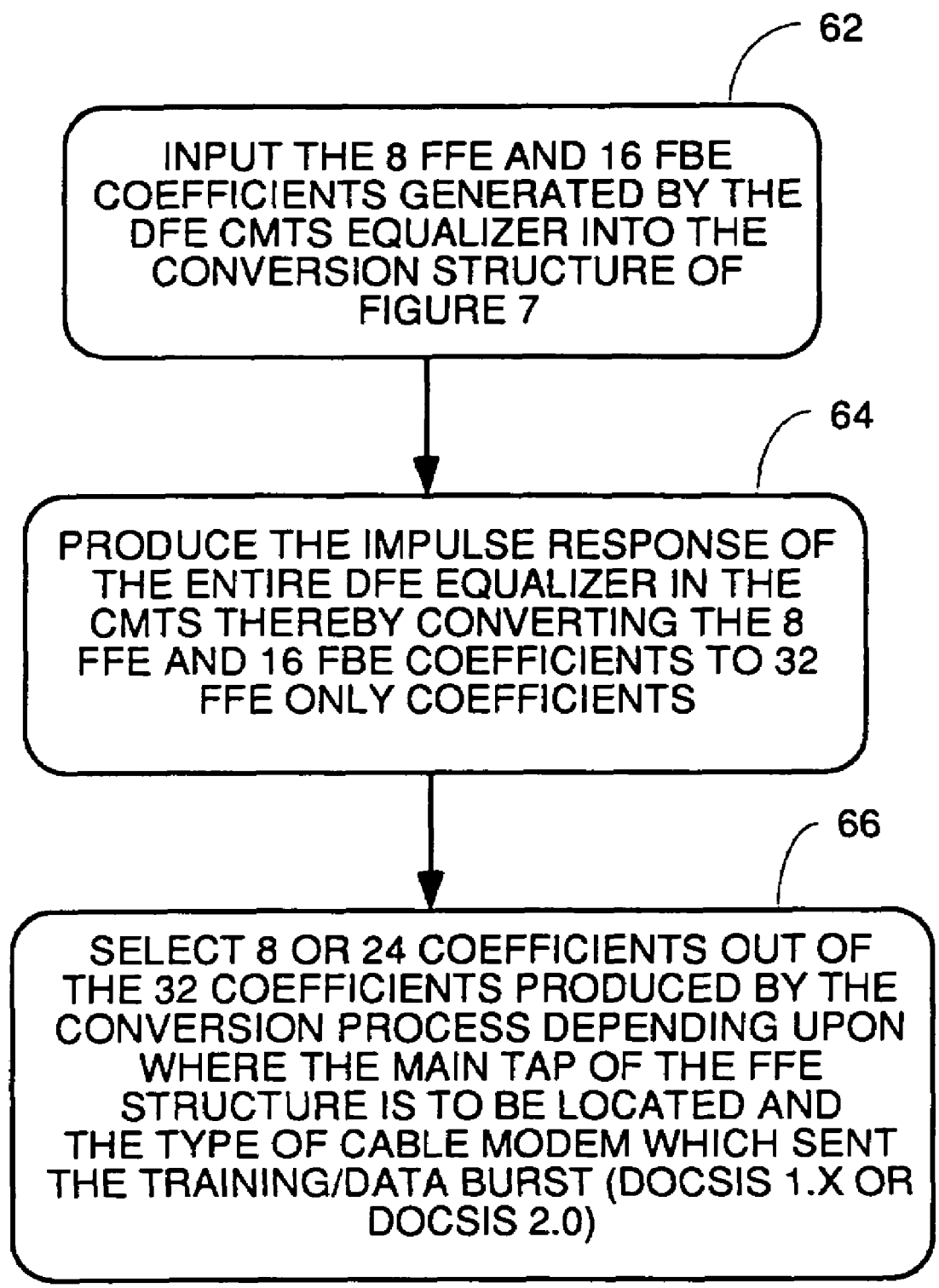
FIG. 6 is a flowchart at a very high level of the process carried out in the CMTS to convert DFE equalizer coefficients to FFE only coefficients.
Figure 7:
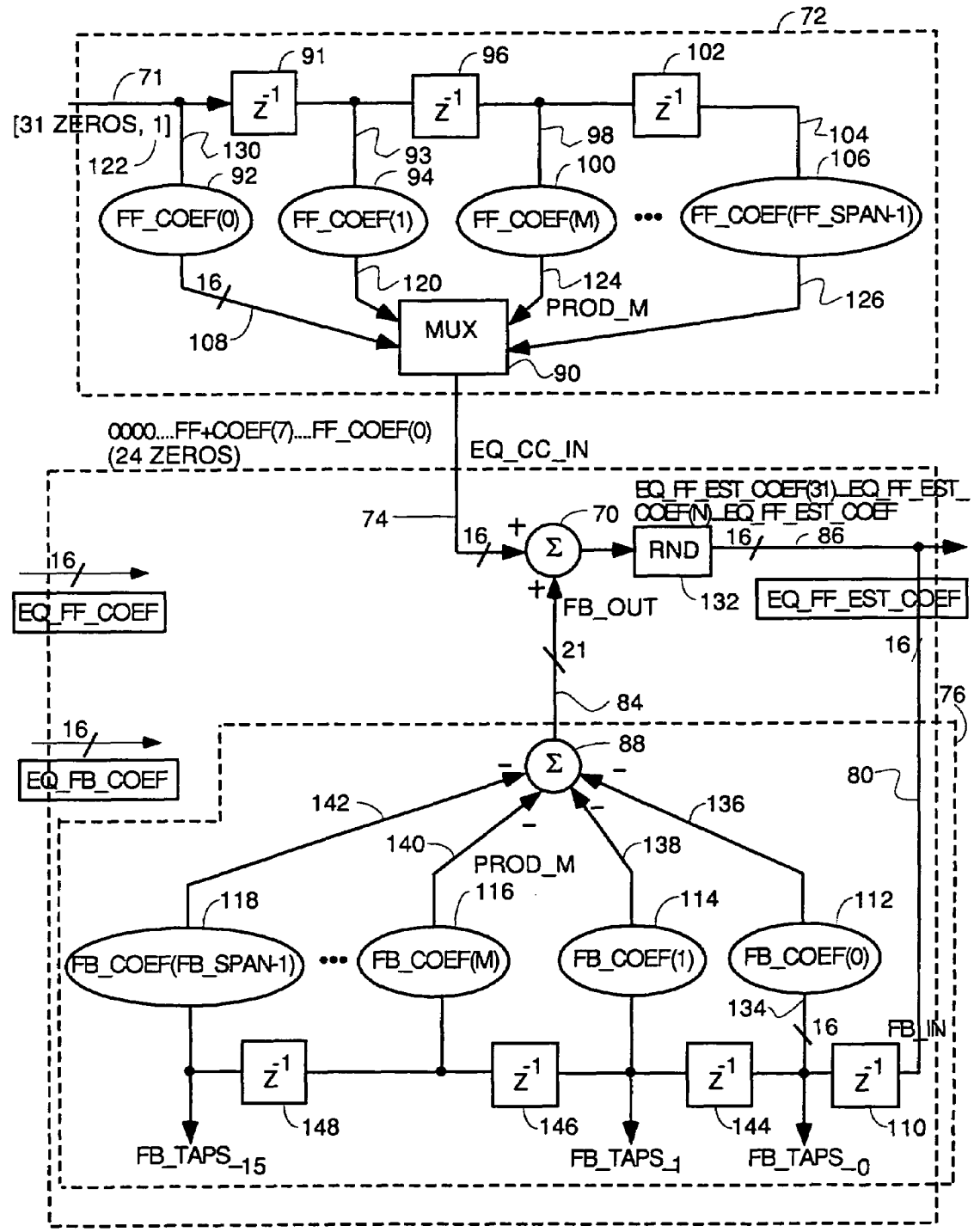
FIG. 7 is a block diagram of an implementation to convert DFE equalizer coefficients to FFE only coefficients.

FIG. 6 is a flowchart at a very high level of the process carried out in the CMTS to convert the FFE and FBE coefficients generated in a DFE filter based CMTS DOCSIS equalizer to FFE only coefficients. Step 62 represents the process of inputting the 8 FFE coefficients and the 16 FBE (feedback filter) coefficients developed by the DFE CMTS equalizer into the conversion filter structure shown in FIG. 7. This sets up the conversion process filter structure to have the same filter coefficients as were converged upon by the DFE CMTS equalizer while processing the training burst from a cable modem. Some of the FFE only coefficients that are generated will be sent back to that same cable modem which sent the training/data burst. Only the first 8 FFE coefficients will be sent for a DOCSIS 1.X cable modem and 24 selected FFE coefficients will be sent for a DOCSIS 2.0 cable modem depending upon where the CMTS wants the main tap in the cable modem upstream equalization filter.

Step 64 represents the process of producing the impulse response of the entire DFE equalizer structure (equalizer with both FFE and FBE filters in it) in the CMTS. This process of producing the impulse response of a filter programmed with the FFE and FBE coefficients generated in the CMTS equalizer results in converting the 8 FFE and 16 FBE coefficients to 32 FFE only coefficients. Finally, step 64 represents the process of selecting 8 or 24 out of the 32 coefficients produced by the conversion process depending upon whether the cable modem is a DOCSIS 1.X or DOCSIS 2.0 cable modem and where the main tap of the FFE structure is to be located.

Figure 8:
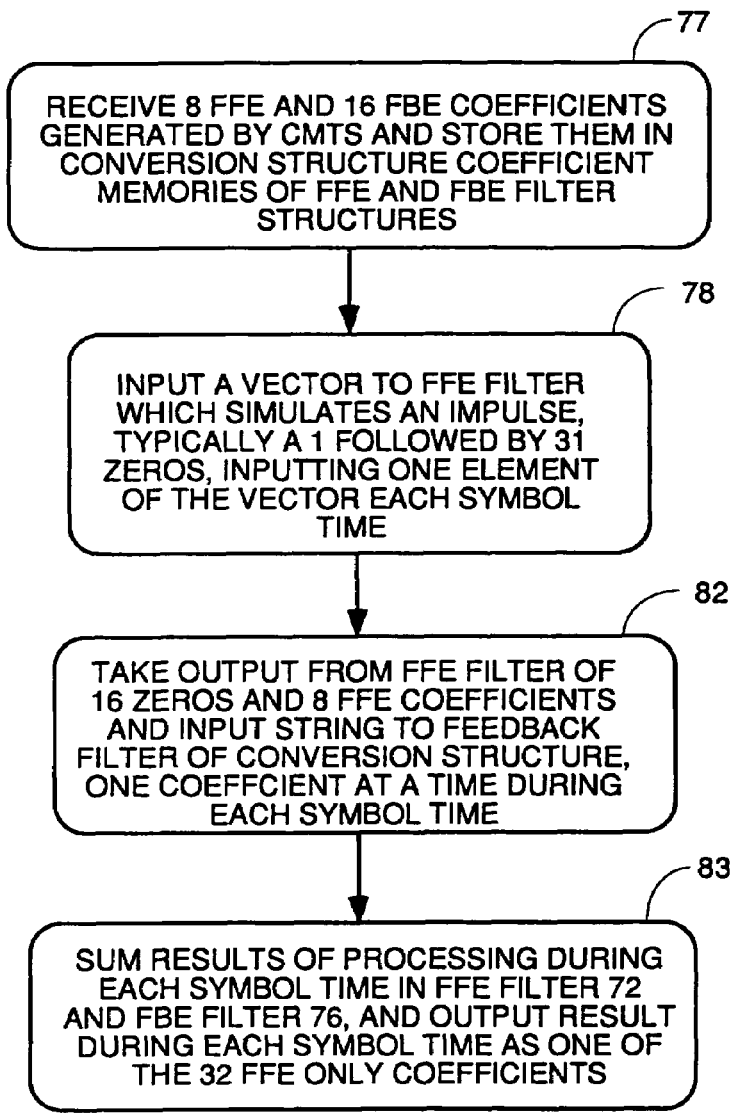
FIG. 8 is a more detailed flowchart of the process to convert CMTS generated upstream equalization coefficients generated DFE equalizer to FFE only coefficients.

FIG. 7 is a block diagram of a filter structure to convert DFE coefficients to FFE only coefficients. The filter structure shown in FIG. 7 is similar to the DFE filter structure in the CMTS but it does not have a hard decision circuit following the summer 70. The digital filter insided dashed box 72 is the feed forward or FFE filter. The FFE filter feeds its output on line 74 to summer 70. The digital filter inside dashed box 76 performs the function of the feedback filter or FBE in the CMTS equalizer. FIG. 8 is a flowchart of the process of using the structure of FIG. 7 to do the conversion. Step 77 represents the setting up of initial coefficients in the conversion structure of FIG. 7. This involves reading the 8 FFE taps generated by the DOCSIS 2.0 upstream equalizer and storing them in coefficient memories 92, 94, 100, 106 etc. of FFE filter structure 72. Then the 16 feedback filter coefficients generated in the feedback filter (FBE) of the DOCSIS 2.0 upstream equalizer are read and stored in coefficient memories 112, 114, 116 and 118 etc. of the feedback filter structure 76. These coefficients are the coefficients upon which the equalizer in the CMTS converged while processing a preamble of known symbols and data in a training burst sent by a cable modem. It is these coefficients which must be converted into FFE only coefficients 8 or 24 of which will be selected and sent back down to the cable modem which sent the training burst.

Step 78 represents the process of inputting an input vector to the FFE filter 72 which simulates an impulse so that the impulse response of the FBE filter structure of FIG. 7 programmed with the filter coefficients just programmed into it can be determined. This impulse response will actually be defined by the filter coefficients that are output on line 86. This impulse response vector is typically a 1 followed by 31 zeros, all simple numbers as opposed to complex numbers. These vector elements are input to the first delay stage 91 of the FFE filter 72 one element at a time during each symbol time.

The output of the FFE filter 72 on line 74 is a sequence of 24 zeros and 8 FFE coefficients. This output on line 74 is used to calculate an input to the feeback filter 76 via line 80, as symbolized by step 82. As each new signal appears on line 80 during each symbol time, it is input to the first delay stage 110 of the feedback filter structure 76. Each new symbol time results in an new coefficient entering delay stage 110, and the previous input entering the next delay stage 144 and being multiplied by the coefficient stored in memory 1 12. As the first input that was input to delay stage 110 propagates through the delay stages 110, 144, 146 and 148 during each successive symbol time, it is multiplied by the coefficients stored in coefficient memories 112, 114, 116 and 118, and the results are output on lines 136, 138, 140 and 142 during successive symbol times and are summed in summer 88. As more inputs enter delay stage 110, the summer 88 has more non zero components on lines 136, 138, 140 and 142 to sum.

The output of the FBE filter section 76 on line 84 is summed with the signals output by the FFE filter 72 in summer 70 and results on line 86 in 32 estimated feed forward coefficients referred to in FIG. 7 as eq_ff_est_coef, as symbolized by step 83. These coefficients define the impulse response of an DFE filter programmed with the FFE and FBE coefficients developed by the DOCSIS 2.0 CMTS upstream equalizer. Once this impulse response is known, these coefficients (actually, a subset of 8 or 24 of them) can be plugged into an FFE only equalizer in a cable modem, and that FFE filter will have the same impulse response and transfer function as the DFE filter in the DOCSIS 2.0 CMTS upstream equalizer.

A more detailed discussion of the conversion process follows. The feed forward filter calculates the FFE coefficients one at a time when the input logic 1 propagates through the various delay stages 91, 96 . . . 102. Each of these delay stages delays propagation of the logic 1 impulse by one symbol time. Each of the coefficient memories 92, 94, 100 and 106 and 112, 114, 116 and 118 is both a memory for storing a coefficient and a multiplier capable of multiplying the coefficient stored therein times the number on the input bus from the delay stage and outputting the result. For example, coefficient memory 94 is typical. It stores a coefficient and multiplies that coefficient times the value on bus 93. The result is output on bus 120. Each of these coefficient memories works the same way.

The circuitry of FIG. 7 is the hardware that does the conversion of the FFE and FBE coefficients generated by the CMTS DOCSIS 2.0 equalizer. Therefore, the coefficients that are initially stored in the coefficient memories are the 8 FFE coefficients from the CMTS equalizer in coefficient memories 92, 94, 100 and 107 (etc. including coefficient memories not shown) and the 16 FBE coefficients generated by the CMTS DOCSIS 2.0 equalizer feedback filter. These 16 FBE coefficients are stored in coefficient memories 112, 114, 116 and 118.

During the first symbol time, the logic 1 which is the first element of the input vector 122 enters delay line stage 91 and is simultaneously multiplied by the FFE coefficient stored in memory 92. The result is output on line 108 which is coupled to one input of a multiplexer 90. Multiplexer 90 could actually be an adder because at every symbol time there is only one of the inputs 108, 120, 124 and 126 that actually has a non zero input. This is because there is only one non zero term in the input vector 122, and as these zeros propagate through the delay line and are multiplied times the coefficients stored in memories 92, 94, 100 and 106, the results are zero. Only maximum one of the lines 108, 120, 124 and 126 has a non zero result at any particular symbol time.

To understand how this works, consider the following. At the end of the first symbol time, the logic 1 will have propagated to line 93, and a logic zero will be on line 130. The logic 1 will be multiplied by the FFE coefficient stored in memory 94, and the result will be output on line 120. A logic 0 will be on line 130, and will be multiplied by the FFE coefficient stored in memory 92, resulting in a zero on line 108. Lines 124 and 126 will each have logic zeros on them as the logic 1 has not reached memories 100 and 106 yet.

At the end of the second symbol time, the logic 1 will have propagated to line 98, and a logic zero will be on line 130 and line 93. The logic 1 will be multiplied by the FFE coefficient stored in memory 100, and the result will be output on line 124. A logic 0 will be on line 130, and will be multiplied by the FFE coefficient stored in memory 92, resulting in a zero on line 108. A logic 0 will be on line 93 and will be multiplied times the FFE coefficient stored in memory 94, and the resulting zero will be output on line 120. Line 126 will have a logic zero on it as the logic 1 has not reached memory 106 yet. And so on, it goes for each symbol time.

The resulting non zero number on line 108 at the beginning of the process is output on line 74 to summer 70 and is summed with zero as there has been no non zero input to delay line segment 110 of the feedback filter structure 76 up to this point. The non zero result on line 108 is coupled through adder/multiplexer 90 and summer 70 and rounding off process 132 to line 80 where it is input to delay line segment 110. By the end of the first symbol time (or thereabouts depending upon delays in the adder 90 and summer 70 and rounding operation 132), the non zero result on line 108 will have propagated to line 134 and will be multiplied by the FBE coefficient stored in memory 112. The result will be output on line 136 in an inverted state where it will be summed with all zeros on lines 138, 140 and 142. All of these signals will be zeros because the non zero result from line 108 at the beginning of the first symbol time will have not propagated through delay line sections 144, 146 and 148 yet. In subsequent symbol times, the non zero result on line 108 at the beginning of the first symbol time will propagate through each of the delay line segments 144, 146 and 148 and be multiplied by the FBE coefficients stored in memories 114, 116 and 118, respectively. Subsequent non zero results from the operations of the FFE filter 72 enter delay line section 110 on subsequent symbol times and propagate through the delay line and get successively multiplied by the FBE coefficients in memories 112, 114, 116 and 118, successively. The string of non zero results on lines 136, 138, 140 and 142 are inverted and summed in summer 88 and the result is output on line 84 where it is summed in summer 70 with the result on line 74.

In other words, the feedback filter 76 sequentially calculates each signal for each branch of the filter, and inverts the signal before summation in summer 88. Therefore, the signal fb_out on line 84 is already inverted and must be added to the output signal eq_cc_in on line 74 to implement the feedback structure.

The resulting output coefficients on line 86 resulting from the impulse function input on line 71 is a collection of coefficients that define the impulse response of the DFE filter structure. The idea is to determine the coefficients of an FFE filter which would give exactly the same impulse response (transfer function) as the DFE filter in the CMTS. Because the coefficients output from the FBE filter resulting from a Dirac function (impulse) input represent the impulse response or transfer function of the FBE filter, these same coefficients can be input to an FFE only equalizer to cause it to have the same transfer function as the FBE equalizer in the CMTS. The input Dirac function is a string of real numbers (a one and 31 zeros) each of which has no imaginary component. The output which results is a string of complex numbers on line 86 each of which represents an FFE coefficient. If all these FFE coefficients were programmed into an FFE only equalizer, the FFE only equalizer would have the same transfer function as the DFE equalizer in the CMTS.

After the DFE coefficients from the DOCSIS 2.0 CMTS equalizer are converted to FFE coefficients, a subset of them must be selected for transmission downstream to the cable modem which transmitted the training burst which caused the original DFE coefficients to be generated in the DOCSIS 2.0 CMTS equalizer. Because 32 FFE coefficients are generated by the above noted conversion algorithm, and only 8 or 24 FFE coefficients are needed by the cable modem, a subset of the FFE coefficients must be chosen.

The preferred CMTS structure uses three registers to specify the main tap location separately for DOCSIS 1.0, advanced TDMA, and SCDMA. The register used to specify the main tap location for advanced TDMA can also be used to specify the main tap location for SCDMA. The main tap of the 32 coefficients impulse response is tap #8, as is also the case for the DOCSIS 2.0 CMTS DE equalizer. The main tap location for the 24 FFE coefficients to be selected can be anywhere from tap #1 to tap #8.

In each cable modem, there are 8 or 24 total FFE taps. The main tap location is #8 usually for DOCSIS 2.0 , and #4 for DOCSIS 1.X, but that location is programmable. If we want the main tap of a DOCSIS 2.0 cable modem which sent the training burst to be #8, then all that is necessary is to pick the first 24 coefficients output by the conversion process and send them to the cable modem with the normal DOCSIS training protocol messages. If however, we want the main tap of the cable modem to be tap #7, it is necessary to skip the first coefficient output by the conversion process and send coefficients #2 to #25 output by the conversion process. For a DOCSIS 1.X modem, if we want the main tap to be at location #4, we will select coefficients #5 to #12. The CMTS tells the cable modem where to put the main tap.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A process for converting feed forward and feedback filter coefficients generated by a cable modem termination system to only feed forward coefficients for use by a cable modem, comprising:

accessing feed forward, hereafter FFE, and feedback, hereafter FBE, coefficients generated by a cable modem termination system upstream equalizer after processing a training burst from a cable modem, and storing said FFE coefficients in coefficient memories of a conversion filter structure having an feed forward filter, a feedback filter and a means for summing the results of each of said feed forward and feedback filters every symbol time, and storing said FBE coefficients in coefficient memories of said feedback filter of said conversion filter structure;

calculating an impulse response of said conversion filter structure, as defined by a plurality of FFE only coefficients output by said conversion filter structure; and providing only FFE coefficients from said coefficients output by said conversion filter structure which define said impulse response, thereby converting FFE coefficients and FBE coefficients to only FFE coefficients.

2. A process for converting feed forward and feedback filter coefficients generated by a Data Over Cable Service Interface Specifications, hereafter DOCSIS compatible cable modem termination system to only feed forward coefficients for use by a cable modem, comprising:

A) receiving feed forward, hereafter FFE coefficients generated by a DOCSIS compatible cable modem termination system upstream equalizer and storing them in coefficient memories of an FFE filter of a conversion filter structure;

B) receiving feedback, hereafter FBE filter coefficients generated by a DOCSIS compatible cable modem termination system (CMTS) upstream equalizer and storing them in coefficient memories of an FBE filter of a conversion filter structure;

C) generating an input vector comprised of a plurality of elements which simulates an impulse and inputting said vector, one element at a time, into a first delay stage of said FFE filter of said conversion filter structure;

D) as said elements propagate through a plurality of delay stages of said FFE filter, multiplying said elements times said FFE coefficients in said coefficient memories of said FFE filter of said conversion filter structure and summing the results;

E) summing the results calculated in step D during each symbol time and inputting said results, one result at a time, into a first delay stage of said FBE filter of said conversion filter structure;

F) as said results propagate through a plurality of delay stages of said FBE filter, multiplying said results times the coefficients stored in said coefficient memories of said FBE filter of said conversion filter structure and inverting and summing the results;

G) summing the results generated in step F with the results generated in step E to generate a plurality of FFE only coefficients.

3. The process of claim 2 wherein step C comprises generating an input vector comprised of a plurality of elements, one of which is a 1 and the rest of which are zeros.

4. The process of claim 2 wherein step A comprises retrieving 8 FFE coefficients from said CMTS equalizer and 16 FBE coefficients from said CMTS equalizer.

5. The process of claim 2 wherein step C comprises generating an input vector with a single 1 followed by 31 zeros to represent a Dirac impulse function.

6. The process of claim 2 further comprising the step of rounding off the results of said summing in step G.

7. The process of claim 2 wherein step G further comprises the step of rounding the results of the summing in step G prior to feeding said results into said first delay stage of said FBE filter.

8. An apparatus comprising:

a feed forward digital filter having an input and a plurality of coefficient memories programmed with feed forward, hereafter FFE coefficients from a feedback, hereafter FBE filter of a cable modem termination system decision feedback equalization, hereafter DFE equalizer after said equalizer has converged upon said FFE coefficients after processing a training burst from a cable modem and having an output at which appears results of processing signals appearing at said input;

a feedback digital filter having an input and having an output and having a plurality of coefficient memories each storing an FBE coefficient from a feedback filter of said cable modem termination system DFE equalizer after said equalizer has converged upon said FFE coefficients after processing a training burst from a cable modem and having an output at which appears inverted results of processing signals appearing at said input a summer coupled to receive output results from said feed forward digital filter and said feedback digital filter, for summing said results during every symbol time and outputting the sum as FFE coefficients only, thereby converting FFE coefficients and FBE coefficients to only FFE coefficients.

9. The apparatus of claim 8 wherein said feed forward digital filter is comprised of a plurality of delay line segments, each imposing a delay of one symbol time, each delay line segment having an output which is coupled to an input of one of said coefficient memories, each said coefficient memory having a memory for storing an FFE coefficient and a multiplier for multiplying a signal at said input of said coefficient memory times said coefficient stored in said memory, each said coefficient memory having an output coupled to one input of a summer, said summer having an output which said output of said feed forward digital filter is presented.

10. The apparatus of claim 8 wherein said feedback digital filter is comprised of a plurality of delay line segments, each imposing a delay of one symbol time, each delay line segment having an output which is coupled to an input of one of said coefficient memories, each said coefficient memory having a memory for storing an FBE coefficient and a multiplier for multiplying a signal at said input of said coefficient memory times said coefficient stored in said memory, each said coefficient memory having an inverter for inverting the result of said multiplication and having an output coupled to one input of a summer, said summer having an output which said output of said feedback digital filter is presented.

* * * * *

UNITED STATES PATENT AND TRADEMARK OFFICE
CERTIFICATE OF CORRECTION

PATENT NO. : 7,443,914 B2 Page 1 of 1
APPLICATION NO. : 10/975177
DATED : October 28, 2008
INVENTOR(S) : Azenkot et al.

It is certified that error appears in the above-identified patent and that said Letters Patent is hereby corrected as shown below:

COLUMN 2:
Lines 36-37: Please delete "The first.....DOCSIS 1.0." and insert the same in Column 2, Line 35 after "plug-n-play". as a continuation.

COLUMN 6:
Lines 9-39: Please delete "Those known........equalization filter" and insert the same in Column 6, Line 8 after "symbols." as a continuation.

COLUMN 7:
Line 49, Please delete "1 12." and replace with --112.--.

COLUMN 9:
Line 61: Please delete "DE" and replace with --DFE--.

Signed and Sealed this

Twenty-fifth Day of August, 2009

David J. Kappos
*Director of the United States Patent and Trademark Office*